United States Patent
Samoto et al.

(10) Patent No.: US 9,307,778 B2
(45) Date of Patent: Apr. 12, 2016

(54) FAT-REDUCED SOYBEAN PROTEIN MATERIAL AND SOYBEAN EMULSION COMPOSITION, AND PROCESSES FOR PRODUCTION THEREOF

(75) Inventors: Masahiko Samoto, Tsukubamirai (JP); Jiro Kanamori, Tsukubamirai (JP); Masayuki Shibata, Tsukabamirai (JP)

(73) Assignee: FUJI OIL HOLDINGS INC., Osaka (JP)

( * ) Notice: Subject to any disclaimer, the term of this patent is extended or adjusted under 35 U.S.C. 154(b) by 0 days.

(21) Appl. No.: 13/702,123

(22) PCT Filed: May 25, 2011

(86) PCT No.: PCT/JP2011/061922
§ 371 (c)(1),
(2), (4) Date: Dec. 5, 2012

(87) PCT Pub. No.: WO2011/155328
PCT Pub. Date: Dec. 15, 2011

(65) Prior Publication Data
US 2013/0078363 A1 Mar. 28, 2013

(30) Foreign Application Priority Data

Jun. 7, 2010 (JP) ................................. 2010-130263
May 13, 2011 (JP) ................................. 2011-108598

(51) Int. Cl.
| | | |
|---|---|---|
| A23J 1/14 | (2006.01) | |
| A23J 3/16 | (2006.01) | |
| A23C 11/10 | (2006.01) | |
| A23L 1/211 | (2006.01) | |

(52) U.S. Cl.
CPC ................. *A23J 1/14* (2013.01); *A23C 11/103* (2013.01); *A23J 3/16* (2013.01); *A23L 1/211* (2013.01); *A23L 1/2111* (2013.01); *A23V 2002/00* (2013.01)

(58) Field of Classification Search
CPC ........................... A23V 2250/2136; A23J 3/16
USPC .......................................................... 426/656
See application file for complete search history.

(56) References Cited

U.S. PATENT DOCUMENTS

| | | | |
|---|---|---|---|
| 6,544,566 | B1 | 4/2003 | Waggle et al. |
| 6,548,102 | B2 | 4/2003 | Fenske et al. |
| 2002/0009460 | A1 | 1/2002 | Wakabayashi et al. |
| 2007/0092633 | A1* | 4/2007 | Singh ............................ 426/656 |

FOREIGN PATENT DOCUMENTS

| | | |
|---|---|---|
| CN | 1323544 | 11/2001 |
| JP | 59-85266 | 5/1984 |
| JP | 61-187763 | 8/1986 |
| JP | 11-56248 | 3/1999 |
| JP | 11-506619 | 6/1999 |
| JP | 2002-20781 | 1/2002 |
| JP | 2002-504828 | 2/2002 |
| JP | 2002-101820 | 4/2002 |
| JP | 2004-141155 | 5/2004 |
| JP | 2009-528847 | 8/2009 |
| JP | 2010-519928 | 6/2010 |
| WO | 97/27761 | 8/1997 |
| WO | 98/58554 | 12/1998 |
| WO | 02/26788 | 4/2002 |
| WO | 2006/046686 | 5/2006 |
| WO | 2007/103753 | 9/2007 |
| WO | 2008/108880 | 9/2008 |

OTHER PUBLICATIONS

Rosenthal et al. "Simultaneous Aqueous Extraction of Oil and Protein from Soybean: Mechanisms for Process Design", Trans IChemE, vol. 76, (1998), p. 224-230.*
Schumacher, H., "Technology for Full-Fat Soya Products and Extracted Soymeal with Different Contents of Water Soluble Protein"—Proceedings of the World Congress on Vegetable Protein Utilization in Human Foods and Animal Feedstuffs, Ed. Thomas H. Applewhite, 1989, pp . 91.*
Kulp et al., Handbook of Cereal Science and Technology, Eds. Karel Kulp; Joseph Ponte, Jr., Marcel Dekker, 2000, p. 321.*
International Search Report issued Aug. 30, 2011 in International (PCT) Application No. PCT/JP2011/061922.
Juliana Maria Leite Nobrega de Moura et al., "Two-Stage Countercurrent Enzyme-Assisted Aqueous Extraction Processing of Oil and Protein from Soybeans", J. Am. Oil Chem. Soc., vol. 86, 2009, pp. 283-289.
International Preliminary Report on Patentability issued Aug. 17, 2012 in International (PCT) Application No. PCT/JP2011/061922.
Extended European Search Report dated Aug. 4, 2014 issued in corresponding European Patent Application No. 11792285.6.
Bookwalter, G.N. et al., "Full Fat Soy Flour Extrusion Cooked: Properties and Food Uses", Journal of Food Science, vol. 36, No. 1, 1971, pp. 5-9.

* cited by examiner

*Primary Examiner* — Elizabeth Gwartney
(74) *Attorney, Agent, or Firm* — Wenderoth, Lind & Ponack, L.L.P.

(57) ABSTRACT

Disclosed are: a fat-reduced soymilk having a reduced fat content, which is produced by separating a fat from a fat-containing soybean efficiently without relying on an organic solvent; and a novel fat-rich soybean material. Specifically disclosed are: a fat-reduced soybean protein material characterized by containing a protein and a carbohydrate at a total content of 80 wt % or more in terms of dried form content, containing a fat (as an extract from a chloroform/methanol mixed solvent) at a content of less than 10 wt % relative to the content of the protein, and containing campesterol and stigmasterol (as plant-derived sterols) at a total content of 200 mg or more relative to 100 g of a fat; and a soybean emulsion composition characterized by containing a protein at a content of 25 wt % or more in terms of dried form content, containing a fat at a content of 100 wt % or more in terms of dried form content relative to the content of the protein in terms of dried form content, and having an LCI value of 60% or more.

7 Claims, No Drawings

FAT-REDUCED SOYBEAN PROTEIN MATERIAL AND SOYBEAN EMULSION COMPOSITION, AND PROCESSES FOR PRODUCTION THEREOF

TECHNICAL FIELD

The present invention relates to a reduced-fat soybean protein material such as reduced-fat soymilk which is obtained from fat-containing soybean as a raw material and a soybean emulsion composition, and a process for producing the same. In particular, the present invention relates to a technique for producing the reduced-fat soybean protein material such as reduced-fat soymilk which is obtained from the fat-containing soybean as a starting raw material without a defatting step using organic solvent, and in which neutral lipid and polar lipid are reduced. In addition, the present invention also relates to a technique for producing the soybean emulsion composition which is obtained from the fat-containing soybean as a starting raw material, and in which neutral lipid and polar lipid are concentrated.

BACKGROUND ART

As a process for producing soybean oil and defatted soybean from soybean in industrial scale, a solvent extraction method which is an extraction using an organic solvent such as hexane is commonly used. When defatted soymilk is produced by water extraction of protein from soybean, a defatted soybean obtained by such a solvent extraction method is water-extracted. The resulting defatted soymilk is pasteurized and packed to provide a liquid product, or pasteurized and dried to provide a powder product. In addition, when a soybean protein isolate is produced by separating and concentrating protein from the defatted soymilk, the resulting defatted soymilk is adjusted to acidic pH to make isoelectric precipitation of protein, and the resulting precipitate is recovered and neutralized, and then pasteurized and dried to provide a powder product.

According to recent report, however, a released solvent during production is a cause of destruction of the ozone layer. In addition, even though solvent elimination of defatted soybean after a solvent extraction is carried out, a negative impression of consumers about using organic solvent as raw material of food is remained. Although a press extraction method as a safer and eco-friendly method is known, this method has a problem that it is difficult to raise the fat recovery rate than the solvent extraction method.

On the other hand, a process of separating soymilk, which is extracted from whole fat soybean, to soymilk having relatively little fat content and an emulsified composition by centrifuging the soymilk to transfer the emulsified composition (cream) having higher fat content to upper layer is considered (Patent Document 1, 2).

In addition, a process of separating off fat from soymilk by demulsifying the soymilk with demulsifier or protease is disclosed (Patent Document 3, Non-Patent Document 1). And, a process of coagulating an oil body from soybean protein by adding salts such as sodium ascorbate or sodium chloride is disclosed (Patent Document 4, 5, 6).

Further, Patent Document 7, 8 describes that soymilk having relatively little fat content and an oil body are obtained by grinding soybean with adding water, heating the ground soybean before or after separating the ground soybean to soymilk and bean curd refuse (okara), and then centrifuging the obtained soymilk at high centrifugal force.

PRIOR ART DOCUMENTS

Patent Documents

Patent Document 1: JP 2009-528847 A
Patent Document 2: JP 2010-519928 A
Patent Document 3: U.S. Pat. No. 6,548,102
Patent Document 4: JP 11-56248 A
Patent Document 5: JP 2002-20781 A
Patent Document 6: JP 11-506619 A
Patent Document 7: WO 2002/26788 A1
Patent Document 8: JP 2002-101820 A

Non-Patent Documents

Non-Patent Document 1: J. Am. Oil Chem. Soc. (2009) 86:283-289

SUMMARY OF THE INVENTION

Problems to be Solved by the Invention

In the process of Patent Document 1, higher centrifugal force (G) is required for separation because particle diameter of lipid emulsified in soymilk is small. Therefore, such a process is not suitable for large-scale production. In addition, even if separation is carried out at high centrifugal force, its actual separation efficiency is low and it is difficult to separate fat in soymilk with a high degree.

The process of demulsifying soymilk described in Patent Document 3 tends to add a taste of demulsifier to product. In addition, demulsifier has limited effectiveness against a separation of fat due to an emulsification strongly formed by an interaction between protein and fat.

In the process of adding salt described in Patent Document 4-6, sodium content is increased with increasing salt concentration, and taste of salt is added to product. For minimizing them, it is necessary to make protein to insoluble, and then carrying out water-washing or dialysis. However, use of volumes of water results in high environmental burden. In addition, natural taste of soybean is lost and mono/oligosaccharide having an intestinal healing effect and isoflavones having physiological functions are reduced.

Patent Document 7, 8 discloses a process of separating fat by heat treatment and high centrifugal force after transferring large part of fat in soybean to soymilk. However, it is difficult to separate fat from soymilk with a high degree, once the fat is emulsified in soymilk. In this case, reduction of an extract (neutral lipid and polar lipid) which is extracted with chloroform/methanol mixed solvent is limited.

As above explained, all of the documents disclose only an insufficient process with a low separation efficiency of fat from soymilk.

In view of the above described problems, an objective of the present invention is to provide a novel reduced-fat soybean processed material such as reduced-fat soymilk in which neutral lipid and polar lipid are reduced, as well as a novel soybean material in which neutral lipid and polar lipid are concentrated, by separating fat from fat-containing soybean with a high degree without using an organic solvent such as hexane.

Unless otherwise noted, a "fat" used in the following refers to total fat including neutral lipid and polar lipid, wherein the total fat is as an extract with chloroform/methanol mixed solvent.

Means for Solving the Problems

In order to solve the above described problems, the present inventors intensively studied, but it is difficult to efficiently remove fat from soymilk without difficulty even if an additive described in Patent Document 3-6 is used because large amount of fat transfers to soymilk and is finely-emulsified by extracting whole fat soybean with water.

The present inventors further intensively studied. In the study, the present inventors have tried to use modified soybean which is subjected to denaturation treatment to give specific NSI range instead of low denatured soybean (usually, 90 or more of NSI) which is generally used as a raw material of soybean material. In the common technical knowledge, when soybean is extracted with water, it is thought that a large amount of fat transfers to water-soluble fraction and is emulsified. Surprisingly, when said modified soybean is used as a raw material and suspended to water and then separating a soluble fraction and an insoluble fraction with a centrifugation, a large amount of fat including polar lipid does not transfer to soymilk as the soluble fraction but transfers to the insoluble fraction (fiber). In addition, the inventors have found that a composition of the insoluble fraction is novel and that the insoluble fraction can be used as the soybean emulsion composition having a taste and physical property suitable for food and beverage. They have also found that the soluble fraction has significantly reduced content of fat, including polar lipid, and novel composition. In addition they have found that the soluble fraction can be used as soybean protein material such as reduced-fat soymilk without deterioration of taste over time due to a remaining fat, having a taste suitable for food and drink, and obtained by a process without defatting step using an organic solvent.

The present invention has been completed on the basis of these findings, and thereby the above problem has been solved.

That is, the present invention is:

(1) A reduced-fat soybean protein material comprising a protein and a carbohydrate at a total content of 80 wt % or more in terms of dry basis, a fat at a content of less than 10 wt % (as an extract with a chloroform/methanol mixed solvent) relative to the protein content, and campesterol and stigmasterol as phytosterols at a total content of 200 mg or more relative to 100 g of the fat;

(2) The reduced-fat soybean protein material according to (1), wherein the protein content is 30 to 99 wt % in terms of dry basis of the reduced-fat soybean protein material;

(3) The reduced-fat soybean protein material according to (1), wherein the reduced-fat soybean protein material is a reduced-fat soymilk;

(4) The reduced-fat soybean protein material according to (1), wherein the reduced-fat soybean protein material is a soybean protein isolate;

(5) The reduced-fat soybean protein material according to (1), wherein the fat content is less than 5 wt % relative to the protein content;

(6) The reduced-fat soybean protein material according to (1), wherein the content of campesterol and stigmasterol as phytosterols is 400 mg or more relative to 100 g of the fat;

(7) The reduced-fat soybean protein material according to (1), wherein an LCI value of the reduced-fat soybean protein material is 40% or less;

(8) The reduced-fat soybean protein material according to (1), wherein a content of lipoxygenase protein is 1% or less relative to the total protein content;

(9) The reduced-fat soybean protein material according to (1), further comprising isoflavones at a content of 0.1 wt % or more in terms of dry basis;

(10) A process for producing the reduced-fat soybean protein material according to (1), comprising the step of:
1) adding water to fat-containing soybean to prepare a suspension liquid; and
2) subjecting the suspension liquid to a solid-liquid separation to transfer neutral lipid and polar lipid to an insoluble fraction, and then recovering a soluble fraction comprising protein and sugar,
wherein the fat-containing soybean comprises a fat at a content of 15 wt % or more in terms of dry basis and has NSI value in the range from 20 to 77;

(11) A process for producing a soybean protein isolate, comprising removing soybean whey component from the reduced-fat soymilk according to (3) and concentrating a protein;

(12) A soybean emulsion composition comprising a protein at a content of 25 wt % or more in terms of dry basis, and a fat at a content of 100 wt % or more (as an extract with a chloroform/methanol mixed solvent) relative to the protein content, wherein the soybean emulsion composition has an LCI value of 60% or more;

(13) The soybean emulsion composition according to (12), further comprising a fiber at a content of 10 wt % or less in terms of dry basis;

(14) A process for producing the soybean emulsion composition according to (12), comprising the step of:
1) adding water to fat-containing soybean to prepare a suspension liquid; and
2) subjecting the suspension liquid to a solid-liquid separation to transfer neutral lipid and polar lipid to an insoluble fraction, removing a soluble fraction comprising protein and sugar, and then recovering the insoluble fraction,
wherein the fat-containing soybean comprises a fat at a content of 15 wt % or more in terms of dry basis and has NSI value in the range from 20 to 77;

(15) The process for producing a soybean emulsion composition according to (14), further comprising homogenizing the recovered insoluble fraction, subjecting the homogenized fraction to a solid-liquid separation to remove a fiber, and then recovering a supernatant;

(16) A process for reducing a fat of a soybean material, comprising adding water to fat-containing soybean to prepare a suspension liquid, subjecting the suspension liquid to a solid-liquid separation to transfer neutral lipid and polar lipid to an insoluble fraction, and then recovering a soluble fraction comprising protein and sugar, wherein the fat-containing soybean comprises a fat at a content of 15 wt % or more in terms of dry basis and has NSI value in the range from 20 to 77; and

(17) A process for concentrating a fat of a soybean material, comprising adding water to fat-containing soybean to prepare a suspension liquid, subjecting the suspension liquid to a solid-liquid separation to transfer neutral lipid and polar lipid to an insoluble fraction, removing a soluble fraction comprising protein and sugar, and then recovering the insoluble fraction, wherein the fat-containing soybean comprises a fat at a content of 15 wt % or more in terms of dry basis and has NSI value in the range from 20 to 77.

Effect of the Invention

The present invention allows to provide a novel reduced-fat soybean protein material such as reduced-fat soymilk in which neutral lipid and polar lipid are sufficiently reduced. In addition, the reduced-fat soybean protein material has high phytosterol content in spite of low fat content. Furthermore, the reduced-fat soybean protein material has less peculiar taste of raw vegetation, and a pleasant soybean taste, as compared with a conventional product. Moreover, the reduced-fat soybean protein material has high stability in change of taste and quality with time.

Alternatively, the present invention allows to provide a novel soybean emulsion composition rich in neutral lipid and polar lipid of soybean, and having less peculiar smell of raw vegetation, and a rich soybean taste as a food material.

In addition, a process for producing the reduced-fat soybean protein material or the soybean emulsion composition of the present invention allows to separate and provide effectively the reduced-fat soybean protein material such as reduced-fat soymilk in which fat is reduced or the soybean emulsion composition in which fat is concentrated from fat-containing soybean by a simple process without using an organic solvent such as hexane.

MODE FOR CARRYING OUT THE INVENTION

<Soybean Emulsion Composition>

The soybean emulsion composition of the present invention is characterized by containing neutral lipid and polar lipid at high content, wherein a ratio of lipophilic proteins (alternatively, lipoxygenase protein as another index) other than glycinin and β-conglycinin is extremely high in total protein of the composition. In addition, the soybean emulsion composition has protein content of 25 wt % or more in terms of dry basis, fat content (as an extract with a chloroform/methanol mixed solvent) of 100 wt % or more relative to the protein content in terms of dry basis, and LCI value of 60% or more. Hereinafter, the soybean emulsion composition of the present invention and a process for producing the same will be explained.

(Fat)

A fat content is generally determined by ether extraction method. However, the soybean emulsion composition of the present invention contains not only neutral lipid but also large amount of polar lipid which is hardly extracted with ether. Therefore, a fat content of the present invention is determined by extracting with a mixed solvent of chloroform and methanol at a volume ratio of 2:1 at atmospheric boiling point for 30 minutes, and calculating fat content with assuming the obtained extract as a total fat. As a solvent extraction equipment, "Soxtec" manufactured by FOSS Co. can be used. That is, a fat content in the present invention refers to the total fat content as an extract with a chloroform/methanol mixed solvent. Hereinafter, the above measurement method is also called as "chloroform/methanol mixed solvent extraction method".

The soybean emulsion composition of the present invention has higher fat content than the value of fat content/protein content of soy flour. Especially, the soybean emulsion composition is rich in polar lipid. Said fat is derived from soybean as a raw material.

A fat content of the soybean emulsion composition of the present invention is 100 wt % or more, preferably 120 to 250 wt %, more preferably 120 to 200 wt % or more relative to protein content in terms of dry basis, that is, fat is more than protein. When fat content is expressed as absolute amount, although it is not indispensable condition, it is preferably 35 wt % or more, more preferably 40 wt % or more in terms of dry basis. When fiber etc. is removed from the soybean emulsion composition, fat content can be 50 wt % or more in terms of dry basis. In addition, an upper limit of the fat content is, but not limited to, preferably 75 wt % or less, more preferably 70 wt % or less.

(Protein)

A protein content of the soybean emulsion composition of the present invention is 25 wt % or more, preferably 30 wt % or more in terms of dry basis. In addition, an upper limit of the protein content is, but not limited to, preferably 50 wt % or less, more preferably 40 wt % or less.

Analysis of Protein Content

The protein content in the present invention is calculated by multiplying a nitrogen content measured by Kjeldahl method by a nitrogen coefficient of 6.25.

Composition Analysis of Each Component of the Protein

Each component composition of protein in the soybean emulsion composition etc. in the present invention can be analyzed by SDS polyacrylamide gel electrophoresis (SDS-PAGE). A hydrophobic interaction and a hydrogen bond between protein molecules and an intermolecular disulfide bond are broken by action of SDS as a surfactant and mercaptoethanol as a reductant, and thereby, the negatively charged protein molecule shows the electrophoresis distance according to peculiar molecular weight. In the result, an electrophoretic pattern peculiar to each protein is obtained. The analysis can be carried out by staining SDS gel with Coomassie brilliant blue (CBB) as a dye after the electrophoresis, and then calculating a proportion of density of band that corresponds to each protein molecule to density of band of total protein by using densitometry.

(Lipoxygenase Protein)

One of characteristics of the soybean emulsion composition of the present invention is containing certain amount or more of lipoxygenase protein which is not generally contained in an oil body of soybean. The soybean emulsion composition contains 4% or more, preferably 5% or more of lipoxygenase protein relative to total protein in the soybean emulsion composition.

When conventional native soybean (NSI 90 or more) is used as a raw material, lipoxygenase protein is soluble and extracted to a soluble fraction after a water extraction. On the other hand, lipoxygenase is denatured by a heat treatment and insolubilized in the soybean raw material, and thereby remaining in an insoluble fraction.

By increasing lipoxygenase protein content in total protein, emulsification state of fat is stabilized, smooth texture, which is difficult to obtain from a general soybean protein composition based on globulin protein, is obtained, and rich taste is added to the soybean composition.

Normally, there are three types of lipoxygenase protein, L-1, L-2 and L-3. A content of each lipoxygenase protein can be calculated from density of band that corresponds to each lipoxygenase protein by using the above electrophoresis.

(Lipophilic Proteins)

One of characteristics of the soybean emulsion composition of the present invention is containing lipophilic proteins among several kind of protein at higher content as compared with conventional soybean composition.

The lipophilic proteins refer to a group of minor acid-precipitable soybean proteins other than glycinin (7S globulin) and β-conglycinin (11S globulin) among acid-precipitable soybean proteins of a soybean, and are accompanied by a lot of polar lipids such as lecithin and glycolipid. Hereinafter, the lipophilic proteins are simply abbreviated as "LP" in some cases.

Since LP is a mixture of various proteins, it is difficult to specify all of respective proteins and LP content. However, LP content can be estimated by determining the following LCI (Lipophilic Proteins Content Index) value. LCI value of protein in the soybean emulsion composition is usually 60% or more, preferably 63% or more, more preferably 65% or more.

When conventional native soybean (NSI 90 or more) is used as a raw material, LP is soluble and extracted to a soluble fraction after a water extraction. On the other hand, LP is denatured by a heat treatment and insolubilized in the soybean raw material, and thereby remaining in an insoluble fraction.

By increasing LP content in total protein, emulsification state of fat is stabilized, smooth texture which is difficult to obtain from a general soybean protein composition based on globulin protein is obtained, and rich taste is added to the soybean composition.

[Method of Estimating LP Content]
(a) As the main proteins in respective proteins, an $\alpha$ subunit and an $\alpha'$ subunit ($\alpha+\alpha'$) are selected for 7S, an acidic subunit (AS) is selected for 11S, and a 34 kDa protein and lipoxygenase (P34+Lx) are selected for LP. Then, a staining ratio among the selected proteins on SDS-PAGE is determined. Electrophoresis can be performed under the condition shown in Table 1.
(b) $X(\%)=(P34+Lx)/\{(P34+Lx)+(\alpha+\alpha')+AS\}\times 100(\%)$ is calculated.
(c) Since the LP content of an isolated soybean protein prepared from a low-denatured defatted soybean is about 38% as measured by the fractionation methods of the above-described Methods 1 and 2 before heat-sterilization, (P34+Lx) is multiplied by a correction coefficient k*=6 so that X becomes 38(%).
(d) That is, an estimated LP content (Lipophilic Proteins Content Index, hereinafter abbreviated as "LCI") is calculated by the equation below.

TABLE 1

| Application amount: | 10 μl of a protein 0.1% sample solution per well |
|---|---|
| Well width: | 5 mm |
| Well volume: | 30 μl |
| Staining solution: | Coomassie Brilliant Blue (CBB) 1 g, methanol 500 ml, glacial acetic acid 70 ml (after CBB is completely dissolved in methanol, acetic acid and water are added to 1 L) |
| Staining time: | 15 hours |
| Discoloration time: | 6 hours |
| Densitometer: | GS-710 Calibrated Imaging Densitometer / Quantity One Software Ver.4.2.3 (Bio Rad Japan Co. Ltd) Scanning width: 5.3 mm, Sensitivity: 30 |

$$LCI(\%) = \frac{k^* \times (P34 + Lx)}{k^* \times (P34 + Lx) + (\alpha + \alpha') + AS} \times 100$$ (Mathematical formula 1)

K*: Correction coefficient (6)
P34: LP main component, 34 kDa protein
Lx: LP main component, lipoxygenase
α: 7S main component, α subunit
α': 7S main component, α' subunit
AS: 11S main component, acidic subunit
(Dry Matter)

Generally, a form of the soybean emulsion composition of the present invention is similar to that of fresh cream. Dry matter in the soybean emulsion composition is usually, but not limited to, around 20 to 30 wt %. For example, the soybean emulsion composition can be a liquid form with low viscosity obtained by adding water, a cream form with high viscosity obtained by condensation and a powder form obtained by powderization.

(Aspect of Producing the Soybean Emulsion Composition)

The soybean emulsion composition of the present invention can be obtained by adding water to a fat-containing soybean which contains a fat at a content of 15 wt % or more in terms of dry basis and which has Nitrogen Solubility Index (hereinafter, refers to "NSI") in the range from 20 to 77, preferably from 20 to 70, to prepare a suspension liquid, and then subjecting the suspension liquid to a solid-liquid separation to transfer neutral lipid and polar lipid to an insoluble fraction, and then removing a soluble fraction including protein and sugar, and then recovering the insoluble fraction. Hereinafter, an aspect of the production method will be explained.

Soybean Raw Material and Processing Thereof

A fat-containing soybean such as whole fat soybean, partially defatted soybean is used as soybean raw material for producing the soybean emulsion composition. The partially defatted soybean includes one obtained by subjecting whole fat soybean to a physical extraction treatment such as press extraction for partially defatting. Generally, whole fat soybean contains about 20 to 30 wt % of fat in terms of dry basis. There are also special soybeans which contain 30 wt % or more of fat. The fat-containing soybean used for the present invention is not limited, but soybean having 15 wt % or more, preferably 20 wt % or more of fat is preferable. A form of the raw material can include halved, grits or powder form. When fat content is too low because of too much defatting, it is difficult to obtain the soybean emulsion composition rich in fat of the present invention. Especially, defatted soybean having 1 wt % or less of neutral lipid content obtained by solvent extraction such as hexane extraction is not preferable because good soybean taste is deteriorated. Therefore, one of characteristics of the present invention is also a technique for defatting soybean without using organic solvent.

Generally, the above described fat-containing soybean is soluble and has 90 or more of NSI because most of the constituent proteins are nature and soluble. However, a modified soybean, which is subjected to a process so that NSI of the modified soybean is 20 to 77, preferably 20 to 70, is preferable. A lower limit of the NSI is more preferably 40 or more, further preferably 41 or more, further more preferably 43 or more, most preferably 45 or more. An upper limit of the NSI is more preferably less than 75, further preferably less than 70. In addition, soybean having low NSI such as less than 65, less than 60 and less than 58 can be used.

Such a modified soybean is obtained by carrying out a processing treatment such as heat treatment and alcohol treatment. The processing treatment includes, but not limited to, heat treatment such as dry heat treatment, steam treatment, superheated steam treatment and microwave treatment, hydrous ethanol treatment, high-pressure treatment and combination thereof.

When NSI is too low, protein ratio in the soybean emulsion composition tends to be high, that is, protein recovery rate into defatted soymilk tends to be low. In addition, unpleasant taste such as roast flavor tends to be added. On the other hand, when NSI is high value such as 80 or more, protein ratio in the soybean emulsion composition is low and fat recovery rate from soybean also tends to be low. In addition, as for the taste, taste of raw vegetation becomes strong.

When heat treatment with superheated steam is carried out, treatment condition cannot be specified for all cases since it will differ depending on manufacturing environment, but appropriate condition for obtaining a modified soybean having the above range of NSI can be determined without special difficulty, for example, heating with superheated steam at about 120 to 250° C. for 5 to 10 minutes. As simple means, commercially available soybean having the above range of NSI can be used.

NSI can be expressed as ratio (wt %) of water-soluble nitrogen (crude protein) to total protein and determined by a prescribed method. In the present invention, NSI is determined by the following method.

To 2.0 g of sample is added 100 ml of water. The mixture is stirred at 40° C. for 60 minutes, and then centrifuged at 1400×g for 10 minutes to obtain supernatant 1. To the residual precipitate is added 100 ml of water. The mixture is stirred at 40° C. for 60 minutes, and then centrifuged at 1400×g for 10 minutes to obtain supernatant 2. The supernatant 1 and supernatant 2 are combined, and water is added to 250 ml. After filtering the mixture with No. 5A filter paper, nitrogen in the filtrate is determined by Kjeldahl method. At the same time, nitrogen in the sample is determined by Kjeldahl method. NSI is the ratio of nitrogen in the filtrate (soluble nitrogen) to total nitrogen in the sample, and expressed as wt %.

The above modified soybean is preferably subjected to a dry or wet tissue destruction treatment such as grinding, crushing and depressing before a water extraction. The soybean can be swelled by water immersion or steaming before the tissue destruction treatment. By the swelling, the amount of energy required to the tissue destruction can be reduced and component having unpleasant taste such as whey protein and oligosaccharide can be eluted and removed, as well as, extraction ratio of globulin protein (in particular, glycinin and β-conglycinin) having high water retention ability and gelling ability to total protein can be increased, that is, transfer ratio of the globulin protein into the soluble fraction can be increased.

Water Extraction from Soybean Raw Material

Water extraction is carried out by adding water at about 3 to 20 times by weight, preferably 4 to 15 times by weight relative to an amount of fat-containing soybean, and thereby preparing a suspension of the fat-containing soybean. When adding ratio of water is high, extraction rate of water-soluble component is high and good separation can be obtained. But, when the adding ratio is too high, a concentration is necessary and thereby increasing in cost. In addition, when water extraction is repeated twice or more, extraction rate of water-soluble component can be improved.

An extraction temperature is not limited. When the temperature is high, an extraction rate of water-soluble component can be improved, but fat also tends to be soluble, and thereby, fat content in the soybean emulsion composition becomes low, on the other hand, fat content in the reduced-fat soymilk becomes high. Therefore, the extraction temperature is preferably 70° C. or lower, more preferably 55° C. or lower. Alternatively, the water extraction can be carried out at 5 to 80° C., more preferably 50 to 75° C.

Concerning an extraction pH (pH of a soybean suspension after adding water), as is the case in the extraction temperature, when the pH is high, an extraction rate of water-soluble component can be improved, but fat also tends to be soluble, and thereby, fat content in the soybean emulsion composition becomes low, on the other hand, fat content in the reduced-fat soymilk becomes high. On the other hand, when the pH is too low, an extraction rate of protein tends to be low. More specifically, the extraction can be carried out with adjusting a lower limit of pH to pH 6 or higher, pH 6.3 or higher, or pH 6.5 or higher. In addition, the extraction can be carried out with adjusting an upper limit of pH to pH 9 or lower, pH 8 or lower, or pH 7 or lower from a standpoint of increasing a separation efficiency of fat. Alternatively, the extraction can be carried out with adjusting pH to more alkaline, pH 9 to 12 from a standpoint of increasing an extraction rate of protein.

Solid-Liquid Separation After the Water extraction

After the water extraction, suspension of the fat-containing soybean is subjected to a solid-liquid separation such as centrifugation and filtration. In this case, it is important that most of fat including neutral lipid as well as polar lipid is not eluted to water-extract, but transferred to a fraction of insolubilized protein and fiber to recover as a precipitate (insoluble fraction). More specifically, 70 wt % or more of fat of fat-containing soybean is transferred to the precipitate. In addition, a small amount of fat is eluted to a supernatant when carrying out the extraction. However, it is different from a fat which is finely emulsified in soymilk, and can easily be floated and separated by centrifuging at 15,000×g or less or about 5,000×g or less. In this respect, it is preferable to use a centrifuge. In addition, an ultracentrifuge at 100 thousand×g or more can be used depending on facilities. However, the present invention can be carried out without using the ultracentrifuge.

In addition, demulsifier can be added during or after the water extraction to improve fat separation from soymilk. The demulsifier is not limited, for example, a demulsifier described in Patent Document 2 can be used. Further, the present invention can be carried out without using the demulsifier.

In the case of using centrifugation as solid-liquid separation, both two phase separation system and three phase separation system can be used. In the case of using the two phase separation system, insoluble fraction as precipitate layer is recovered. In the case of using the three phase separation system, it can be separated to three fractions, (1) floating layer (cream fraction with lowest specific weight including fat), (2) mid layer (water-soluble fraction including a small amount of fat and large amounts of protein and sugar) and (3) precipitate layer (insoluble fraction including large amounts of fat and fiber). In this case, soluble fraction, mid layer (2) is removed or recovered, and floating layer (1) or precipitate layer (3) is recovered. Alternatively, floating layer (1) and precipitate layer (3) are recovered in combination.

The obtained insoluble fraction (1) and (3) can be the soybean emulsion composition of the present invention as is, or after subjecting to concentration step, heat pasteurization step and powderization step as necessary.

Removal of Fiber

When the obtained insoluble fraction includes fiber, for example, the above fraction (3) or fractions (1) and (3), as necessary, a soybean emulsion composition in which fiber (okara) is removed and rich taste is more concentrated can be obtained by adding water to the fraction, homogenizing the solution with a high-pressure homogenizer or a Jet Cooker Heater, and then centrifuging the homogenized liquid to recover a supernatant. As necessary, additional step such as heat treatment step and alcohol treatment step can be carried out before or after the homogenization to make protein extraction easier. In this case, fiber content is preferably 10 wt % or less, more preferably 5 wt % or less in terms of dry basis. Fiber content in the present invention can be determined by enzymatic-gravimetric method (Modified Prosky Method) based on "STANDARD TABLES OF FOOD COM- POSITION IN JAPAN Fifth Revised and Enlarged Edition" (Ministry of Education, Culture, Sports, Science and Technology, Japan, 2005).

(Feature and Use of the Soybean Emulsion Composition)

The soybean emulsion composition of the present invention contains a specific range of fat content (neutral lipid and polar lipid) and protein content. Among the protein, especially LP content is high. The soybean emulsion composition optionally contains fiber. In addition, the soybean emulsion composition has concentrated delicious natural taste of soybean, very rich taste and no or little unpleasant taste such as taste of raw vegetation, astringency, and harsh taste. Therefore, the soybean emulsion composition can be used as a raw material for various foods.

Although an emulsion composition similar in composition can be obtained by adding water and fat to conventional soy flour or soybean protein isolate, it is difficult to prepare the composition having similar lipoxygenase protein content and LCI value. Because of this, the soybean emulsion composition prepared with a technique of the present invention has much better taste than the prepared product. Therefore, the soybean emulsion composition has good aptitude for a food raw material.

<Reduced-Fat Soybean Material>

The reduced-fat soybean protein material of the present invention, such as reduced-fat soymilk, is found from same technical idea of the above soybean emulsion composition and paired with the soybean emulsion composition. The reduced-fat soybean protein material contains protein based on glycinin and β-conglycinin as major component. In the case of the reduced-fat soymilk, relatively large amount of soluble component such as sugar and ash is contained. On the other hand, fiber is removed, fat including both neutral lipid and polar lipid is reduced, in addition, LP content such as lipoxygenase protein content is low. A soybean protein material other than soymilk includes a soybean protein material in which purity of protein is improved from said soymilk as a raw material, more specifically, soybean protein isolate in which purity of protein is improved by removing soluble components such as sugar and ash from soymilk or fractionated soybean protein in which purity of glycinin or β-conglycinin is improved by further fractionating protein from the soymilk or the soybean protein isolate. The soybean protein isolate or the fractionated soybean protein can be prepared by a well known method.

Although a raw material is fat-containing soybean, the reduced-fat soybean protein material such as reduced-fat soymilk has protein content same as a defatted soymilk or a soybean protein isolate obtained by extracting defatted soybean defatted by using organic solvent such as hexane. More specifically, protein content is 30 wt % or more, preferably 50 wt % or more in terms of dry basis. However, component other than protein of the reduced-fat soybean protein material of the present invention is significantly different from that of conventional reduced-fat soybean protein material such as defatted soymilk.

Hereinafter, the reduced-fat soybean protein material such as reduced-fat soymilk and a process for producing the same will be explained.

(Carbohydrate)

Sugar and protein are major component of the reduced-fat soybean protein material of the present invention and constituent a large part of dry matter. Total content of protein and carbohydrate (a content of dry matter excluding fat, protein and ash) in the reduced-fat soybean protein material is 80 wt % or more, preferably 85 wt % or more in terms of dry basis. Remaining dry matter consists of ash and a slight amount of fat, and ash content is usually 15 wt % or less, preferably 10 wt % or less. Although fiber is included in carbohydrate, fiber is removed from the reduced-fat soybean protein material of the present invention. Therefore, fiber content is small, more specifically, 3 wt % or less, preferably 2 wt % or less.

(Protein)

A protein content of the reduced-fat soybean protein material of the present invention can be in a range from 30 to 99 wt % in terms of dry basis. As is the case in the soybean emulsion composition, the protein content is calculated by multiplying a nitrogen content measured by Kjeldahl method by a nitrogen coefficient of 6.25. When the soybean protein material is soymilk, a lower limit of the protein content is usually 45 wt % or more, or 50 wt % or more, or 55 wt % or more, and an upper limit can be 70 wt % or less, or 65 wt % or less. Depending on a process such as fractionation of protein and adding other component, protein content can be in a range from 30 wt % or more to less than 45 wt %. In addition, when the reduced-fat soybean protein material is a soybean protein isolate in which purity of protein is improved by further purifying a soymilk, a lower limit of protein content can be more than 70 wt % or 80 wt % or more, and an upper limit can be 99 wt % or less, or 95 wt % or less.

(Lipoxygenase Protein)

It is also a quite characteristic of the reduced-fat soybean protein material of the present invention that a content of lipoxygenase protein which is generally easily extracted due to its water-solubility is extremely low, and it is 1% or less, preferably 0.5% or less relative to total protein in the reduced-fat soybean protein material.

When a conventional nature soybean (NSI of 90 or more) is used as a raw material, lipoxygenase protein is extracted to water-soluble fraction by water extraction because the lipoxygenase protein is soluble state. On the other hand, lipoxygenase protein is remained in the insoluble fraction because the lipoxygenase protein is denatured and insolubilized in the raw material soybean by heat treatment.

There is an advantage that soymilk in which fat content is maintained to extremely low level can be obtained because a rate of lipoxygenase protein in protein of the reduced-fat soybean protein material is extremely low.

The protein content of the reduced-fat soybean protein material and each component composition of the protein can be analyzed as is the case in the soybean emulsion composition.

(Lipophilic Proteins: LP)

It is one of characteristics of the reduced-fat soybean protein material of the present invention that LP content is smaller than conventional soybean material among types of protein.

LP content can be estimated as LCI value as is the case in the soybean emulsion composition. In this case, LCI value of the protein in the reduced-fat soybean protein material is usually 40% or less, more preferably 38% or less, further preferably 36% or less.

When a conventional nature soybean (NSI of 90 or more) is used as a raw material, LP is extracted to water-soluble fraction by water extraction because the LP is soluble state. On the other hand, LP is remained in the insoluble fraction because the LP is denatured and insolubilized in the raw material soybean by heat treatment.

There is an advantage that soymilk in which fat content is maintained to extremely low level can be obtained because a rate of LP in protein of the reduced-fat soybean protein material is extremely low.

(Fat)

The reduced-fat soybean protein material of the present invention, such as reduced-fat soymilk, contains fat at a value lower than a ratio of fat content/protein content of soy flour as a raw material. And, both neutral lipid content and polar lipid content in the reduced-fat soybean material are low. Fat as used herein refers to total fat (neutral lipid and polar lipid) derived from soybean protein raw material. On the other hand, conventional reduced-fat soymilk is obtained by water extraction of defatted soybean defatted with hexane, and contains much more polar lipid which is not removed.

That is, fat content of the reduced-fat soybean protein material of the present invention, such as reduced-fat soymilk, relative to protein content is less than 10 wt %, preferably less than 9 wt %, more preferably less than 8 wt %, further preferably less than 5 wt %, further more preferably 4 wt % or less. Also, 3 wt % or less is possible. That is, it is one of quite characteristics that total fat including neutral lipid and polar lipid is far less than protein. This fat content refers to fat content as an extract with a chloroform/methanol mixed solvent. A conventional defatted soymilk extracted from defatted soybean defatted by using organic solvent contains less neutral lipid, but fat content relative to protein is about 5 to 6 wt % because some of polar lipid is extracted. That is, fat content of the reduced-fat soybean protein material of the present invention is reduced similarly or more than conventional defatted soymilk obtained by using organic solvent.

In addition, fat content in terms of dry basis is also 5 wt % or less, preferably 3 wt % or less, more preferably 2 wt % or less, further preferably 1.5 wt % or less.

(Phytosterol)

It is one of characteristics that the reduced-fat soybean protein material of the present invention has much higher phytosterol content relative to fat content than conventional defatted soymilk.

A phytosterol is contained in soybean seed at about 0.3 wt %, and includes sitosterol, campesterol, stigmasterol and the like. These phytosterols contained in soybean are largely transferred to soybean oil due to their low polarity when soybean oil is extracted with organic solvent such as hexane, and then the phytosterols are removed through a process of purifying the soybean oil. Therefore, defatted soybean contains very small amount of phytosterol.

On the other hand, in the reduced-fat soybean protein material, it is found that campesterol and stigmasterol as phytosterols which are more lipophilic and water-insoluble are remained at especially large amount in spite of low content of neutral lipid and polar lipid. Thus, it is very difficult to increase a phytosterol content relative to fat content in a reduced-fat soybean protein material by a method other than adding separately. The present invention has an advantage that a soybean protein material, which contains little amount of fat and a large amount of phytosterol, can be provided.

Total content of campesterol and stigmasterol in a reduced-fat soybean protein material which is prepared by using a defatted soybean defatted with organic solvent such as hexane is about 40 to 50 mg per 100 g of fat. On the other hand, a reduced-fat soybean protein material of the present invention has much higher content, for example, 200 mg or more per 100 g of fat, preferably 230 mg or more, more preferably 400 mg or more, further preferably 450 mg or more, further more preferably 500 mg or more per 100 g of fat.

A content of these phytosterols are determined by general method, for example, calculating from ratio of peak area of sample to that of reference standard determined by using chromatography after an extraction with organic solvent.

For example, phytosterol content can be determined based on a method for quantitating sterol of Japan Food Research Laboratories (see annex flow chart of No. 11014761 analytical method). In particular, 1.2 g of sample is dispersed to 50 ml of ethanol solution of potassium hydroxide (1 mol/L), and then carrying out saponification, and then extracting unsaponifiable matter to ether layer by adding 150 ml of water and 100 ml of diethyl ether, further adding 50 ml of diethyl ether twice to extract. The diethyl ether layer containing unsaponifiable matter is water-washed and subjected to dewatering filtration and then evaporated. The obtained extract is applied to column (silica gel cartridge column), and washed with 10 ml of diethyl ether:hexane (8:92) solution, and then eluted with 25 ml of diethyl ether:hexane (20:80) solution. To the eluted solution is added 0.5 mg of 5α-cholestane as internal standard, and then evaporated. To the resultant sample is added 5 ml of hexane, and then applied to gas chromatograph (with hydrogen flame ionization detector) to detect an objective phytosterol. The gas chromatography can be carried out according to the following conditions.

| <Operating conditions of gas chromatograph> | |
| --- | --- |
| Model: | GC-2010 (Shimadzu Corporation) |
| Detector: | FID |
| Column: | DB-1 (J&W SCIENTIFIC) ø0.25 mm × 15 m, Film thickness 0.25 μm |
| Temperature: | Inlet 290° C., Detector 280° C., Column 240° C., increased to 280° C. at a rate of 3° C./rain |
| Sample injection system: | Split (split ratio 1:30) |
| Flow rate: | Helium (as carrier gas) 2.3 ml/min, Helium (as make up gas) 30 ml/min |
| Pressure: | Hydrogen 40 ml/min, Air 400 ml/min |

(Isoflavones)

It is one of characteristics that the reduced-fat soybean protein material contains relatively large amount of isofravone. More specifically, 0.10 wt % or more in terms of dry basis is preferable. Isoflavone content can be determined according to an analytical method described in "Standards and criteria for food containing isoflavone (public announcement No. 50, revised edition)" (Japan Health and Nutrition Food Association, issued on Mar. 6, 2009). In the present invention isoflavone content refers to an equivalent amount as a glycoside.

(Dry Matter)

When the reduced-fat soybean protein material is reduced-fat soymilk and liquid form, dry matter in the reduced-fat soybean protein material is usually, but not limited to, around 3 to 20 wt %. For example, the reduced-fat soybean protein material can be a liquid form with low viscosity obtained by adding water, a form with high viscosity obtained by condensation such as vacuum concentration and freeze concentration and a powder form obtained by powderization such as spray drying and lyophilization.

(Aspect of Producing the Reduced-Fat Soybean Protein Material)

A method for producing a reduced-fat soymilk and other reduced-fat soybean protein materials of the present invention is characterized by adding water to a fat-containing soybean which contains a fat at a content of 15 wt % or more in terms of dry basis and which has NSI value in the range from 20 to 77, preferably 20 to 70, to prepare a suspension liquid, and then subjecting the suspension liquid to a solid-liquid separation to transfer neutral lipid and polar lipid to an insoluble fraction, and then recovering a soluble fraction comprising protein and sugar to obtain the reduced-fat soymilk having the above described composition.

More specifically, in the same aspect of producing the soybean emulsion composition, the reduced-fat soybean protein material can be obtained by recovering the soluble fraction after transferring neutral lipid and polar lipid to the insoluble fraction. In the case of using two phase separation system, a supernatant is recovered as soluble fraction. In the case of using three phase separation system, mid layer (2) is recovered as soluble fraction.

Soybean Raw Material and Processing Thereof

The same modified raw material for producing the soybean emulsion composition can be used. When fat content of the raw material is too low because of too much defatting, it is difficult to obtain the reduced-fat soymilk of the present invention containing little amount of fat and a large amount of phytosterol. When NSI of the processed soybean raw material is too high, separation efficiency between fat and protein is reduced, and thereby, increasing fat content in the reduced-fat soymilk. In addition, as for the taste, taste of raw vegetation becomes strong.

Water Extraction from Soybean Raw Material and Solid-Liquid Separation

Water extraction can also be carried out in the same temperature condition, pH condition as above described method for producing the soybean emulsion composition. In addition, solid-liquid separation after the water extraction can also be carried out in the same manner as the above described.

Reduced-Fat Soymilk

The obtained soluble fraction can be the reduced-fat soymilk of the present invention as is, or after subjecting to concentration step, heat pasteurization step and powderization step as necessary.

Soybean Protein Isolate

Soybean protein isolate with high purity of protein can be prepared by removing soybean whey component such as whey protein and oligosaccharide and concentrating protein, and if necessary, further subjecting to neutralization, pasteurization, drying and powderization. As for a method of removing soybean whey component, any well known method can be used. For example, as most common method, a method including, adjusting pH of the reduced-fat soymilk to acidic pH nearby isoelectric point (pH about 4 to 5) to isoelectric precipitate, and subjecting the mixture to centrifuge to remove whey as supernatant and recover the precipitate, can be applied. In addition, a method of removing whey having relatively low molecular weight by membrane separation can be applied.

(Feature and Use of the Reduced-Fat Soybean Protein Material)

As contrast with defatted soymilk and soybean protein isolate which are obtained by water extraction of defatted soybean defatted with hexane or the like, the reduced-fat soybean protein material has low content of fat, especially polar lipid, and low calories. In addition, because organic solvent such as hexane is not used, the present invention results in less environmental burden and the reduced-fat soybean protein material has significantly fine taste in absence of a denaturation with organic solvent. In addition, the reduced-fat soybean protein material is characterized by showing high oxidation stability and less deterioration of taste over time because polar lipid and LP content is low.

When the reduced-fat soybean protein material is reduced-fat soymilk, the obtained water-soluble fraction can be used as the reduced-fat soymilk after pasteurization by using these advantages.

In addition, when the reduced-fat soybean protein material is used as powder form by drying, taste stability is significantly high because fat is not oxidized as contrasted with a conventional soymilk powder and soybean protein powder.

<Process for Concentrating Fat of Soybean Material>

A process for concentrating a fat of a soybean material of the present invention is characterized by using a fat-containing soybean containing a fat at a content of 15 wt % or more in terms of dry basis and having NSI value in the range from 20 to 77, preferably 20 to 70, and including adding water to the fat-containing soybean to prepare a suspension liquid, subjecting the suspension liquid to a solid-liquid separation to transfer neutral lipid and polar lipid to an insoluble fraction, removing a soluble fraction containing protein and sugar, and then recovering the insoluble fraction.

More specifically, in the aspect of producing the soybean emulsion composition as soybean material, neutral lipid and polar lipid can be concentrated in the soybean material by recovering an insoluble fraction obtained by solid-liquid separation after a step of water extraction. A fat content of the soybean material can be 100 wt % or more, preferably 120 to 250 wt %, more preferably 120 to 200 wt % or more relative to protein content in terms of dry basis, and fat transfer rate from the fat-containing soybean can be 80% or more without adding fat separately. Thus, very rich taste can be added to the soybean material, and aptitude for use of the soybean material is extensible.

<Process for Reducing Fat of Soybean Material>

A process for reducing a fat of a soybean material of the present invention is characterized by using fat-containing soybean including a fat at a content of 15 wt % or more in terms of dry basis and having NSI value in the range from 20 to 77, preferably 20 to 70, and including adding water to fat-containing soybean to prepare a suspension liquid, subjecting the suspension liquid to a solid-liquid separation to transfer neutral lipid and polar lipid to an insoluble fraction, and then recovering a soluble fraction containing protein and sugar.

More specifically, in the aspect of producing the reduced-fat soybean protein material as soybean material, neutral lipid and polar lipid can be reduced from the soybean material by recovering a soluble fraction into which protein and sugar are transferred obtained by solid-liquid separation after a step of water extraction. More specifically, fat content can be reduced to 5 wt % or less in terms of dry basis and fat transfer rate from fat-containing soybean can be 10% or less.

In this manner, reduced-fat soybean protein material can be obtained without using defatted soybean defatted with organic solvent such as hexane. The reduced-fat soybean protein material can be used for producing defatted soymilk, soybean protein isolate, as well as fractionated soybean protein such as β-conglycinin and glycinin.

EXAMPLES

Examples of the present invention will be described below. The "%" described below refers to "wt %", unless otherwise specified. Measurement of fat is carried out based on the chloroform/methanol mixed solvent extraction method unless otherwise noted.

Example 1

Preparation of a Soybean Emulsion Composition and a Reduced-Fat Soymilk

To 3.5 kg of soy flour which was subjected to wet heat treatment to make NSI of 59.4 was added with 4.5 times its weight of water at 50° C. to prepare suspension liquid. The suspension liquid was stirred for 30 minutes with keeping warm for water extraction. The pH of the suspension liquid at this time was 6.7. Centrifugation with three phase separation system was continuously carried out at 6,000×g to separate to (1) floating layer, (2) mid layer and (3) precipitate layer. Then, 6.3 kg of soybean emulsion composition as combination of the floating layer and the precipitate layer, and 12 kg of reduced-fat soymilk as the mid layer were recovered. Each fraction was lyophilized. And, as general constituent, dry matter, and protein (by Kjeldahl method), fat (by chloroform/methanol mixed solvent extraction method) and ash in terms of dry basis were measured. In addition, LCI value as estimated value of lipoxygenase protein content and LP content was analyzed by SDS-PAGE. Each transfer rate (%) which represents what % of each component, dry matter, protein content or fat content was transferred to the reduced-fat soymilk or the soybean emulsion composition was calculated on the condition that the each component in soy flour was set to 100% (see table 2).

in boiled water for 10 minutes. In the soybean emulsion composition, rich taste of soybean was concentrated. The reduced-fat soymilk had stronger sweet taste and good taste different from conventional soymilk and conventional defatted soymilk.

Example 2

To the soybean emulsion composition obtained in Example 1 was added with 0.5 times its weight of water. The mixture was homogenized with high pressure homogenizer at 13 MPa. The homogenized liquid was heated with direct steam blowing heating at 142° C. for 7 seconds. The liquid was subjected to continuous centrifugation at 6,000×g to separate and remove insoluble fiber. The supernatant fraction was recovered as anew soybean emulsion composition. After a lyophilization, general constituent, lipoxygenase protein content and LCI were analyzed in a similar manner in Example 1 (see table 3).

TABLE 2

|  | Dry matter (%) | In terms of dry basis (%) | | | Transfer rate (%) | | | Protein composition (%) | |
| --- | --- | --- | --- | --- | --- | --- | --- | --- | --- |
|  |  | Protein | Fat | Ash | Dry matter | Protein | Fat | Lipoxygenase | LCI |
| Soy flour | 95.3 | 43.1 | 30.0 | 5.0 | 100 | 100 | 100 | 3.6 | 57 |
| Reduced-fat soymilk | 10.0 | 63.2 | 2.3 | 9.8 | 34.9 | 51.1 | 2.7 | 0.3 | 40 |
| Soybean emulsion composition | 30.6 | 32.2 | 43.0 | 4.3 | 61.9 | 46.3 | 88.8 | 6.2 | 67 |

As shown in table 2, the reduced-fat soymilk contained little fat, more specifically, fat content in terms of dry basis was 2.3% which was 5% or less, and fat content relative to protein content was 3.6%. That is, fat could be significantly reduced from soymilk without using organic solvent to soy flour. Most part (89%) of fat contained in soy flour was transferred to the soybean emulsion composition, and the soybean emulsion composition rich in fat was obtained. In the soybean emulsion composition, protein content was 25% or more (32%) in terms of dry basis, fat content was 35% or more (43%) in terms of dry basis, and a ratio of fat content to protein content was 1 or more (1.3).

Lipoxygenase protein content of the soybean emulsion composition was 4% or more (6.2%), and was higher than that of soy flour. On the other hand, the reduced-fat soymilk contained little lipoxygenase protein, that is, 1% or less (0.3%) in protein. LCI value of the soybean emulsion composition was 60% or more (67%), and was higher than that of soy flour, 57%.

A taste of the obtained reduced-fat soymilk and soybean emulsion composition was evaluated after heat pasteurization

TABLE 3

|  | Dry matter (%) | In terms of dry basis (%) | | | Protein composition (%) | |
| --- | --- | --- | --- | --- | --- | --- |
|  |  | Protein | Fat | Ash | Lipoxygenase | LCI |
| Soybean emulsion composition | 30.6 | 32.2 | 43.0 | 4.3 | 6.2 | 67 |
| Supernatant fraction | 18.2 | 32.2 | 58.9 | 3.9 | 6.1 | 67 |
| Fiber fraction | 19.3 | 33.0 | 26.4 | 4.9 | 6.3 | 67 |

The supernatant fraction contained 5% of carbohydrate in terms of dry basis and 2% of fiber in terms of dry basis while the soybean emulsion composition of Example 1 contained 20.5% of carbohydrate in terms of dry basis. Fat content of the supernatant fraction was increased from 43% to 59% in terms of dry basis and ratio of fat content to protein content was 1.8 because of removing fiber. As a result, the supernatant fraction as a soybean emulsion composition had good quality with further concentrated rich taste of soybean.

Example 3, 4 and Comparative Example 1

To 20 g of each of three soy flours having different NSI value due to heat condition (NSI: 59.5, 66.8, 94.9) was added 300 g of water. The mixture was adjusted to pH 7.5 with 20% NaOH, and stirred at 50° C. for 30 minutes. The mixture was separated with centrifugation at 1,400×g for 10 minutes to cream layer, mid layer and precipitate layer (okara). A soybean emulsion composition was obtained by combining the cream layer and the precipitate layer. The remained mid layer was recovered as a soymilk. After a lyophilization, general constituent of each fractions was measured in a similar manner in Example 1 (see table 4).

had protein content of less than 25% (18%) in terms of dry basis, and taste of raw vegetation and poor taste.

Analytical Example 1

Comparison to Commercially Available Soybean Emulsion Composition

Analysis of compositions of commercially available soybean emulsion composition, "Soy Supreme Kreme" (manufactured by SunOpta Grains and Foods Group) in terms of dry basis gave following result.

TABLE 4

| Raw material | | | Dry matter (%) | In terms of dry basis (%) | | Transfer rate (%) | | |
|---|---|---|---|---|---|---|---|---|
| | NSI | | | Protein | Fat | Dry matter | Protein | Fat |
| Example 3 | 59.3 | Cream layer | 5.3 | 31.7 | 45.9 | 1.6 | 1.2 | 2.4 |
| | | Mid layer | 3.0 | 58.3 | 0.5 | 39.4 | 53.2 | 0.7 |
| | | Precipitate layer | 22.3 | 34.1 | 44.1 | 62.4 | 49.3 | 91.7 |
| | | Cream + Precipitate | 21.9 | 34.0 | 44.1 | 64.0 | 50.5 | 94.2 |
| Example 4 | 66.8 | Cream layer | 7.0 | 26.0 | 57.1 | 3.2 | 1.9 | 6.2 |
| | | Mid layer | 3.2 | 59.1 | 2.3 | 44.0 | 59.5 | 3.4 |
| | | Precipitate layer | 23.2 | 29.9 | 45.5 | 48.8 | 33.5 | 75.4 |
| | | Cream + Precipitate | 22.3 | 29.7 | 46.2 | 52.0 | 35.3 | 81.6 |
| Comparative Example 1 | 94.9 | Cream layer | 16.4 | 12.9 | 80.9 | 13.2 | 4.0 | 36.0 |
| | | Mid layer | 3.9 | 62.1 | 8.1 | 55.6 | 81.2 | 15.2 |
| | | Precipitate layer | 19.4 | 20.4 | 37.4 | 28.9 | 13.8 | 36.5 |
| | | Cream + Precipitate | 18.5 | 18.0 | 51.1 | 42.1 | 17.9 | 72.5 |

When soy flour having NSI of 59.5 (Example 3) or NSI of 66.8 (Example 4) was used as raw material, transfer rate of fat in total fat of mid layer (soymilk) was 10% or less (0.7% or 3.4%) and fat content was enough reduced to 5% or less (0.5% or 2.3%) in terms of dry basis, that is, good separation property was shown. In addition, in both soybean emulsion compositions of Examples 3 and 4, protein content was 25% or more (34% or 30%) in terms of dry basis and fat content relative to protein was 100% or more (130% or 156%) in terms of dry basis.

On the other hand, when soy flour having NSI of 94.9 (Comparative Example 1) in which protein was nature was used as raw material, 15% of fat in total fat was transferred to mid layer and fat content was 8.1% in terms of dry basis. Thus, separation property was insufficient. In addition, the soybean emulsion composition of Comparative Example 1

| Protein | 32.0% |
|---|---|
| Fat | 54.5% |
| | (170% relative to protein) |
| Carbohydrate | 10.4% |
| Ash | 4.5% |
| Fiber | 5.7% |
| LCI value | 49.6% |
| Lipoxygenase protein content relative to protein | 2% |

It is thought that this commercially available soybean emulsion composition has been manufactured by the method described in Patent Document 3 (U.S. Pat. No. 6,548,102). In this composition, demulsifier is used as essential additive. As shown in the above, LCI value and lipoxygenase protein content were very different between this composition and the soybean emulsion composition of Example 2. That is, the soybean emulsion composition of the present invention had significantly higher LP content than conventional product. Taste of the soybean emulsion composition of the present invention was good with rich and signature taste in comparison with that of commercially available composition.

<Comparison of Taste of Soybean Emulsion Compositions>

Comparative assessment was carried out with four products, the soybean emulsion composition obtained in Example 1, 2, and Comparative Example 1, and commercially available soybean emulsion composition used in Analytical Example 1 by evaluating taste (rich taste, taste of raw vegetation and astringency) of each product. Result of the evaluation was shown in table 5.

TABLE 5

| Sample | Rich taste | Taste of raw vegetation | Astringency | Overall evaluation |
|---|---|---|---|---|
| Example 1 | ++ | ± | + | ◯ |
| Example 2 | +++ | ± | ± | ⊙ |
| Comparative Example 1 | ± | ++++ | +++ | X |

TABLE 5-continued

| Sample | Rich taste | Taste of raw vegetation | Astringency | Overall evaluation |
|---|---|---|---|---|
| Analytical Example 1 | + | +++ | ++ | Δ |

(Evaluation criteria)
−: Not detectable,
±: Almost not detectable,
+: Detectable,
++: Slightly strongly detectable,
+++: Strongly detectable
⊙: Strongly rich taste of soybean, no bad taste flavor, no pungent taste
◯: Rich taste of soybean, little of bad taste
Δ: Slightly rich taste of soybean, bad taste
X: Little of rich taste of soybean, strongly bad taste Example 5-8, Comparative Example 2, 3

Preparation of Various Reduced-Fat Soymilks

Various reduced-fat soymilks (Example 5-8, Comparative Example 2, 3), were prepared in the same manner as Example 1 except that raw material, NSI, ratio of adding water, extraction temperature, extraction time and extraction pH were changed as described in table 6. In Example 7 and Comparative Example 3, pH was adjusted with sodium hydroxide. Recovered amount, dry matter concentration (%), protein content in terms of dry basis (%), LCI value, fat content (as an extract with a mixed solvent of chloroform and methanol at a volume ratio of 2:1) relative to protein (%) and phytosterol content (total of campesterol and stigmasterol content) per 100 g of fat (mg) of the obtained various reduced-fat soymilk were analyzed and data was summarized in table 6. In addition, data of Example 1 prepared with similar manufacturing scale was described in table 6 for comparison.

TABLE 6

| | Raw material | | | Extraction condition | | | |
|---|---|---|---|---|---|---|---|
| | Form | Scale | NSI | Ratio of adding water | Temperature (° C.) | Time (min) | pH |
| Example 5 | Soy flour | 5 kg | 56 | 9 | 60 | 15 | 6.5 |
| Example 6 | Soy flour | 5 kg | 63 | 4 | 60 | 30 | 6.5 |
| Example 7 | Soy flour | 5 kg | 65 | 9 | 60 | 30 | 7.5-8.0 |
| Example 8 | Soy flour | 5 kg | 75 | 8 | 60 | 30 | 6.5 |
| Comparative Example 2 | Defatted soy flour (hexane defatting) | 5 kg | 89 | 10 | 60 | 30 | 6.5 |
| Comparative Example 3 | Soy flour | 5 kg | 85 | 9 | 60 | 30 | 7.5-8.0 |
| Example 1 | Soy flour | 3.5 kg | 59.4 | 4.5 | 50 | 30 | 6.7 |

| | Recovered amount of soymilk | Dry matter (%) | Protein/dry matter (%) | LCI | Fat/Protein (%) | Phytosterol (mg)/100 g fat |
|---|---|---|---|---|---|---|
| Example 5 | 31 kg | 5.0 | 50 | 32 | 2.8 | 642.9 |
| Example 6 | 12 kg | 10 | 55 | 36 | 4.9 | 408.2 |
| Example 7 | 31 kg | 5.1 | 53 | 37 | 8.4 | 250.0 |
| Example 8 | 36 kg | 6.2 | 59 | 38 | 4.5 | 311.1 |
| Comparative Example 2 | 12 kg | 6.5 | 67 | 43 | 5.2 | 42.31 |
| Comparative Example 3 | 32 kg | 6.3 | 55 | 48 | 12.0 | 225.0 |
| Example 1 | 12 kg | 10 | 63 | 40 | 3.6 | 583.3 |

Fat content measured with ether extraction method in the conventional defatted soymilk of Comparative Example 2 was almost 0%. However, in the case of chloroform/methanol mixed solvent extraction method, fat content relative to protein content was 5.2%. That is, it is shown that conventional defatted soymilk contains large amount of polar lipid which is not extracted with hexane. In addition, phytosterol content relative to fat content was significantly lower than that of Example.

In Comparative Example 3, fat content relative to protein was extremely high because of high NSI of raw material, fat-reducing from soybean was insufficient. On the other hand, all of the reduced-fat soymilks of Examples had low level, 10% or less, of fat content relative to protein although raw material was whole fat soybean with high fat content.

Many of Examples showed same or lower level of fat content and higher phytosterol content in comparison with Comparative Example 2, and showed non-conventional signature composition. In addition, LCI values of Examples were lower than that of Comparative Example 2.

In addition, total isoflavone content in the reduced-fat soymilk of Example 5 was analyzed. As a result, isoflavone was contained at 0.266% in terms of dry basis.

Analytical Example 2

Analysis of Commercially Available Soybean Protein Isolate

In three commercially available soybean protein isolates (manufactured by SPECIALITY PROTEIN PRODUCERS, INC.) which were thought to be manufactured by the methods described in Patent Document 1, 2, protein content, fat content, phytosterol content and LCI value were analyzed. Analytical values were shown in below.

TABLE 7

|  | Dry matter (%) | Protein/ dry matter (%) | LCI | Fat/ Protein (%) | Phytosterol (mg)/ 100 g fat |
|---|---|---|---|---|---|
| GPF ECO-Ultra Gel SPI 6500 | 95.0 | 86.2 | 45 | 13.7 | 144.1 |
| GPF Meat SPI 6500 | 95.0 | 87.3 | 43 | 11.8 | 165.0 |
| GPF Extrusion SPI 4221 | 95.0 | 88.0 | 48 | 15.2 | 134.3 |

These commercially available products are soybean protein isolates prepared from soybean, not defatted soybean defatted with organic solvent. However, all of these products have 12% or more of fat content relative to protein. It can be understood that separation of polar lipid from soymilk is insufficient. Phytosterol content is also significantly low, about 134 to 165 mg per 100 g of fat, in comparison to that of the reduced-fat soybean protein material of the present invention. In addition, all LCI values are 43 or more. It can be understood that large amount of LP is contained.

As a result of analysis of isoflavone content, total isoflavone content of "ECO-Ultra Gel SPI 6500" was 0.186% in terms of dry basis.

As shown in the above, these commercially available products were very different from the reduced-fat soybean protein material of the present invention in the point of their components.

Comparative Example 4

Supplementary Test of Patent Document 8 (JP 2002-101820 A)

Patent Document 8 describes a technique for separating cream layer, by heating and centrifuging a soymilk obtained from soybean seed. Here, supplementary test of the technique was carried out. And, protein content, fat content and LCI value of the obtained reduced-fat soymilk were analyzed.

After washing, 40 g of soybean seed was put into 200 ml beaker, and water was put into the beaker to scale of 150 ml, and the beaker was stored in refrigerator (4° C.) overnight. To the water-absorbed soybean was added water to make total weight to 300 g, and then ground with a mixer for 2 minutes, and then further ground for 2 minutes. The obtained ground product was filtered with Buchner funnel on which a cotton wool pad was spread to obtain soymilk without heating. The obtained soymilk was put into conical flask, and heated in boiling water. After the temperature was 75° C., the soymilk was heated for 10 minutes with keeping 75° C. After the heating, the soymilk was cooled with chilled water to room temperature (about 25° C.) to obtain soymilk. The obtained soymilk was centrifuged at 6,200×g for 30 minutes, and the resulting floating fraction (cream) was removed. In addition, soymilk as the under layer which was thought to contain low fat content was recovered with preventing contamination of cream, and then lyophilized to obtain a sample. In addition, sample of reduced-fat soymilk with heating at 95° C. was prepared in same manner as described above except that heat temperature was 95° C. Analytical values of the above samples were shown in the following.

TABLE 8

|  | Dry matter (%) | Protein/dry matter (%) | LCI | Fat/ Protein (%) | Phytosterol (mg)/ 100 g fat |
|---|---|---|---|---|---|
| Reduced-fat soymilk with heating at 75° C. | 3.0 | 65.3 | 52 | 29.4 | 85.0 |
| Reduced-fat soymilk with heating at 95° C. | 3.0 | 62.1 | 49 | 33.9 | 82.6 |

Fat content relative to protein of each sample was more than 29% and was far higher than that of the reduced-fat soybean protein material of the present invention. Separation of polar lipid from soymilk was insufficient even if heat treatment was carried out because fat content was not reduced even if heating temperature was increased from 75° C. to 95° C. In addition, LCI value was also high, 49 or more. Composition of the supplementary sample of Patent Document 8 was very different from that of the reduced-fat soybean protein material of the present invention.

Example 9

Preparation of Soybean Protein Isolate

To 20 kg of soy flour in which NSI was adjusted to 55 was added with 300 kg of water and adjusted to pH 6.5 to prepare suspension liquid. The suspension liquid was stirred at 50° C. for 30 minutes for extraction. Centrifugation was carried out at 1,400×g for 10 minutes to separate to cream layer, mid layer and precipitate layer (okara). Then, soymilk as mid layer was recovered and concentrated to 12% of dry matter, and adjusted to pH 4.5 with adding appropriate amount of hydrochloric acid. The obtained soymilk was subjected to separation with centrifuge at 3,000×g for 15 minutes to recover precipitate.

To the recovered precipitate was added water so that dry matter was 18%, and adjusted to pH 7.5 with adding appropriate amount of sodium hydroxide. The mixture was heat sterilized under pressure and then splay dried to prepare soybean protein isolate.

Analytical result of the obtained soybean protein isolate was, 96.0% of dry matter, 82.1% of protein, 1.90% of total fat (2.31% relative to protein), 6.57% of ash and 9.43% of carbohydrate, in terms of dry basis. In addition, phytosterol content was 10.7 mg per 100 g of dry matter (564 mg per 100 g of fat), and total isoflavone content was 0.301% in terms of dry basis.

Taste of the obtained soybean protein isolate of the present invention was good without taste of raw vegetation, astringency and harsh taste in comparison with that of commercially available soybean protein isolate which was prepared from defatted soybean defatted with hexane.

<Comparison of Taste of Reduced-Fat Soybean Protein Material>

Comparative assessment was carried out with the following products, the reduced-fat soymilk of the present invention obtained in Example 5, reduced-fat soymilk of Comparative Example 2 prepared from defatted soybean defatted with hexane, soybean protein isolate (SPI) of the present invention obtained in Example 9, commercially available SPI of Analytical Example 2 "GPF Meat SPI 6500", conventional commercially available product "Fujipro F" (manufactured by Fuji-oil co. ltd.) prepared from defatted soymilk defatted with hexane, by evaluating taste of each product. Result of the evaluation was shown in the following.

TABLE 9

| Sample | Hexane defatting | Storage period of powder at 30° C. | | | Overall evaluation |
| --- | --- | --- | --- | --- | --- |
| | | 0 month | 1 month | 3 months | |
| Example 5 (soymilk) | None | ± | ± | ± | ⊙ |
| Comparative Example 2 (soymilk) | Done | ++ | ++ | +++ | X |
| Example 9 (SPI) | None | ± | ± | ± | ⊙ |
| Analytical Example 2 (commercially available SPI) | None | + | ++ | +++ | Δ |
| Conventional commercially available SPI | Done | ++ | ++ | +++ | X |

(Evaluation criteria)
Concerning bad taste (taste of raw vegetation, astringency and oxidized flavor)
±: Not detectable,
+: slightly detectable,
++: Strongly detectable,
+++: More strongly detectable
⊙: No bad taste, no deterioration during storing
○: Little of bad taste, little of deterioration during storing
Δ: Little of bad taste, but generation of bad taste during storing
X: Bad taste even before storing

INDUSTRIAL APPLICABILITY

The reduced-fat soymilk and soybean emulsion composition of the present invention can be prepared without using an organic solvent. There are no potential for destruction of air pollution and the ozonosphere. In addition, the present invention is possible to contribute also to the energy saving because step of evaporating an organic solvent from defatted soybean is not necessary. The present invention can provide soybean protein material with eco-friendly. That is, the present invention can contribute to realize an eco-friendly and sustainable society.

The invention claimed is:

1. A process for producing a reduced-fat soybean protein material, comprising the steps of:
   (1) adding water to
      a modified fat-containing soybean, which comprises, as a raw material, a fat at a content of 15 wt % or more in terms of dry basis and has a Nitrogen Solubility Index (NSI) value in the range from 20 to 65, wherein "modified" means that protein in the fat-containing soybean is denatured to 20 to 65 of NSI,
      to prepare a suspension liquid;
   (2) subjecting the suspension liquid of the modified fat-containing soybean to a solid-liquid separation to transfer a neutral lipid, a polar lipid and a protein comprising a lipophilic protein as a major component to an insoluble fraction comprising fiber, and
   (3) then removing the insoluble fraction and recovering a soluble fraction comprising sugar and protein comprising glycinin and β-conglycinin as major components,
   wherein the fat content is calculated as a total amount extracted with a mixed solvent of chloroform and methanol at a volume ratio of 2:1 at an atmospheric boiling point for 30 minutes, and
   wherein the NSI value is determined by the following procedure:
   (a) adding 100 ml of water to 2.0 g of a sample to obtain a first mixture,
   (b) stirring the first mixture at 40° C. for 60 minutes, and then subjecting the first mixture to centrifugation at 1400×g for 10 minutes to obtain a supernatant 1,
   (c) adding 100 ml of water to a residual precipitate to obtain a second mixture,
   (d) stirring the second mixture obtained in step (c) at 40° C. for 60 minutes, and then subjecting the second mixture to centrifugation at 1400×g for 10 minutes to obtain a supernatant 2,
   (e) combining supernatant 1 and supernatant 2, and adding water to 250 ml to obtain a third mixture,
   (f) filtering the third mixture with No. 5A filter paper to obtain a filtrate,
   (g) determining a nitrogen content in the filtrate by the Kjeldahl method,
   (h) determining a nitrogen content in the sample by the Kjeldahl method, and
   (i) calculating the NSI value as wt % by dividing the nitrogen content in the filtrate by the nitrogen content in the sample.

2. A process for producing a soybean protein isolate, comprising removing a soybean whey component from the reduced-fat soybean protein material obtained by the process according to claim 1.

3. The process according to claim 1, wherein a fat transfer rate from the modified fat-containing soybean to the soluble fraction is 10% or less.

4. The process according to claim 1, wherein the step (1) is carried out at a pH of 6 or higher and 7 or less.

5. The process according to claim 1, wherein the NSI value of the modified fat-containing soybean is 20 or more and less than 60, wherein "modified" means that protein in the fat-containing soybean is denatured to 20 to 60 of NSI.

6. A process for reducing a fat of a soybean material, which comprises the steps of:
(1) adding water to
a modified fat-containing soybean, which comprises, as a raw material, a fat at a content of 15 wt % or more in terms of dry basis and has a Nitrogen Solubility Index (NSI) value in the range from 20 to 65, wherein "modified" means that protein in the fat-containing soybean is denatured to 20 to 65 of NSI,
to prepare a suspension liquid,
(2) subjecting the suspension liquid of the modified fat-containing soybean to a solid-liquid separation to transfer a neutral lipid, a polar lipid and a protein comprising a lipophilic protein as a major component to an insoluble fraction comprising fiber, and
(3) then removing the insoluble fraction and recovering a soluble fraction comprising sugar and protein comprising glycinin and β-conglycinin as major components,
wherein the fat content is calculated as a total amount extracted with a mixed solvent of chloroform and methanol at a volume ratio of 2:1 at an atmospheric boiling point for 30 minutes, and
wherein the NSI value is determined by the following procedure:
(a) adding 100 ml of water to 2.0 g of a sample to obtain a first mixture,
(b) stirring the first mixture at 40° C. for 60 minutes, and then subjecting the first mixture to centrifugation at 1400×g for 10 minutes to obtain a supernatant 1,
(c) adding 100 ml of water to a residual precipitate to obtain a second mixture,
(d) stirring the second mixture obtained in step (c) at 40° C. for 60 minutes, and then subjecting the second mixture to centrifugation at 1400×g for 10 minutes to obtain a supernatant 2,
(e) combining supernatant 1 and supernatant 2, and adding water to 250 ml to obtain a third mixture,
(f) filtering the third mixture with No. 5A filter paper to obtain a filtrate,
(g) determining a nitrogen content in the filtrate by the Kjeldahl method,
(h) determining a nitrogen content in the sample by the Kjeldahl method, and
(i) calculating the NSI value as wt % by dividing the nitrogen content in the filtrate by the nitrogen content in the sample.

7. The process according to claim 6, wherein the NSI value of the modified fat-containing soybean is 20 or more and less than 60, wherein "modified" means that protein in the fat-containing soybean is denatured to 20 to 60 of NSI.

* * * * *